3,171,250
MALFUNCTION CONTROL SYSTEM
Sigmund H. Machlanski, Yucaipa, and Carle C. Conway III, Fair Oaks, Calif., assignors to Aerojet-General Corporation, Azusa, Calif., a corporation of Ohio
Filed Feb. 6, 1961, Ser. No. 87,163
13 Claims. (Cl. 60—35.6)

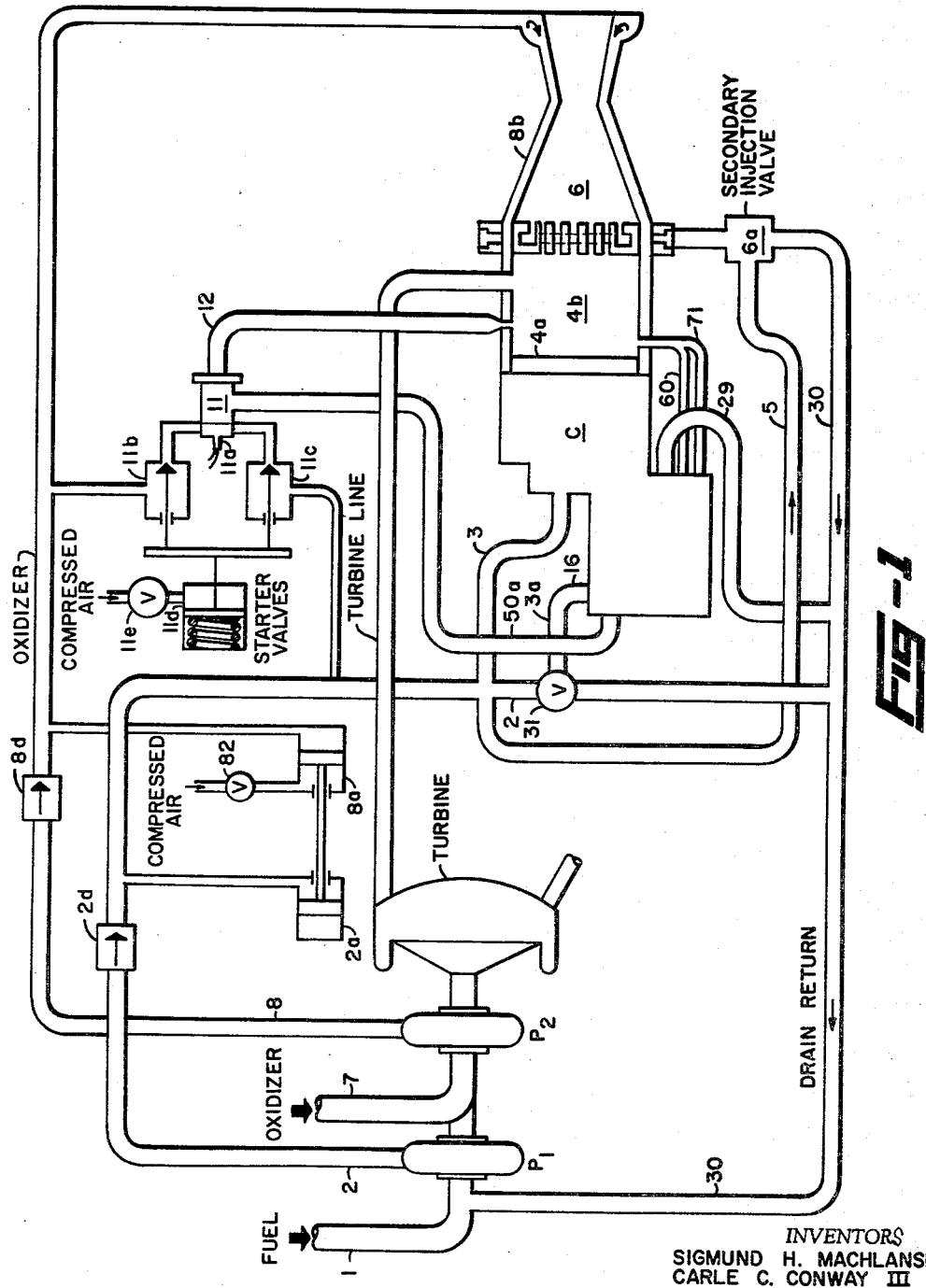

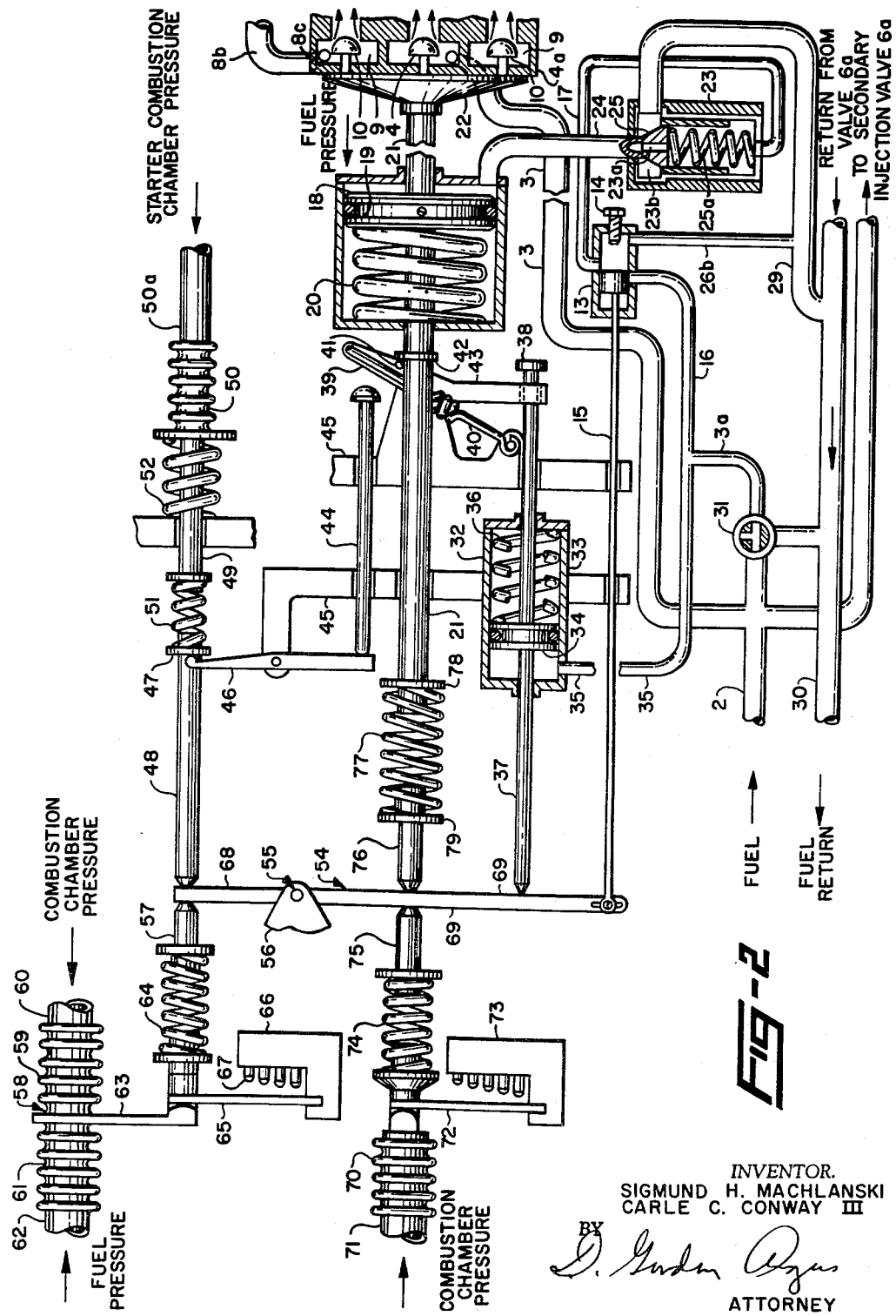

This invention relates to a malfunction control for liquid fuel rocket motors.

This application is a continuation-in-part of my copending application Serial Number 654,418, filed April 22, 1957, now abandoned.

Rocket motors require very carefully designated control systems because of the extremely high energy developed by the fuel, and the number of components, all of which must operate within close limits to insure proper functioning of the motor, and the faulty operation of some of which elements may cause a violent explosion. A faulty operation is instantly detected and if the failure is remedied or the motor shut down safely, damage to the motor may be avoided.

When starting and stopping a liquid fuel rocket engine, a sequence of operations is required; the duration of which has been carefully calculated, although the time interval of some may be only some thousandth of a second.

Before this invention, the operation of the various engine components in the manner required was usually effected by electrical means with elaborate interlocks, various relays, time delays, and other components resulting in complicated and expensive systems. These components could easily get out of adjustment, provide only intermittent control and their operation requires skilled technicians.

A major danger to be considered during the starting and functioning of liquid fuel rocket engines is possible accumulation of unburnt fuel in the thrust chamber. These conditions are evidenced by an absence or sudden loss of pressure in the combustion chamber and require, substantially instantaneous closing of the fuel and/or oxidizer ejection valves to prevent further hazardous propellant injection.

In addition, a number of other safeguards are desirable in starting the motor in case all auxiliary functions for proper operations are not performing satisfactorily, and similarly to guard against malfunctions in shutting down the motor.

The control mechanism must be very sensitive, function with extreme rapidity, necessitating very small but accurate control movements of some mechanical parts, and be capable of withstanding and transmitting high stresses and intense vibration.

The malfunction control of the present invention is specifically concerned with the control of the combustion chamber injection plate valve means which governs the flow of fuel to the combustion chamber. The basic feature of the invention resides in a computing device, per se, which may be incorporated in various control systems and in conjunction with various subsidiary or auxiliary mechanisms to insure safe functioning of a rocket motor from starting to shut down, including repeated firings.

It is the primary object of the invention to provide a continuous direct sensing means operating to maintain direct control of fuel flow rate into a thrust chamber in relation to the fuel flow rate out of a thrust chamber.

A further object of the invention is to provide a malfunction control operative to terminate the rocket engine operation in the event that the fuel flow rate drops below a predetermined critical value.

For these and other objects in view, the invention comprises a computing device which continuously compares the fuel flow rate into a combustion chamber with the fuel flow rate, exhausted from the combustion chamber, and controls a fuel injector plate valve means which regulates the flow of fuel into the combustion chamber. The preselected values of flow rates are set sufficiently below designed operating efficiency to allow for normal performance variations due to system tolerances.

Still further features and objects of the invention will hereinafter appear from the following specification and the accompanying drawings of a preferred embodiment of the invention.

In the drawings:

FIGURE 1 is a schematic diagram showing the environment of the automatic combustion chamber control device in a liquid fuel rocket engine; and, FIGURE 2 is a schematic diagram of the automatic combustion chamber control device.

Referring now to FIGURE 1 of the drawing, the fuel inlet line 1 leads to a pump $P_1$ that discharges the fuel under pressure through line 2 and check valve 2d. Part of the fuel is conducted by branch line 3 to the injector plate valve 4 (FIGURE 2) arranged in an injector plate 4a and the primary chamber 4b. The remainder of the fuel is conducted through line 5 and secondary injection valve 6a to the secondary thrust chamber 6. The oxidizer is conducted through line 7 to pump $P_2$ and is then delivered under pressure through line 8 and check valve 8d to the cooler passages 8b surrounding the combustion chamber nozzle and then through inlet 8c to the oxidizer manifold 9 (FIGURE 2). The manifold 9 surrounds the fuel inlet valve 4 in the injector plate 4a and from the manifold 9, the oxidizer is injected through oxidizer valves 10 surrounding the fuel inlet valve 4. Pumps $P_1$ and $P_2$ are driven by a turbine indicated by the legend "turbine" which in turn is driven by hot pressurized gas brought from chamber 4b through the conduit indicated by the legend "turbine line."

The engine is put into operation by fuel and oxidizer delivered from starter pumps 2a and 8a operated by air under pressure from any suitable source (not shown) through the line indicated by the legend "compressed air" and valve 82. The pressurized fuel and oxidizer is transmitted through the starter valves 11b and 11c operated by piston or servo-motor 11d, which is controlled by valve 11e, and also to the starter chamber 11 in which ignition is effected by glow plug 11a.

The pressure generated in the starter chamber 11 is led by conduit 50a to the malfunction control unit C to permit opening of the primary injection valve of the engine by a pilot valve 13. The burning gases from the starter chamber are injected through conduit 12 into the combustion chamber to ignite the propellant injected therein.

Referring to FIGURE 2, the pilot valve 13 is provided with an adjustable limit stop 14 to control opening of the injection plate valve 4 at a predetermined maximum rate by control of the rate of flow of fuel. The valve 13 is provided with an operating rod 15 which is controlled by the computing device. Fuel is supplied to the pilot valve 13 through pipe 16 from fuel line 2 and branch line 3a, the fuel flowing through the valve 13 and pipe 17 through the coil spring 25a in the rapid shut down valve 23 and through pipe 24 to the actuator cylinder 18 controlling the fuel and oxidizer valves 4 and 10 in the injection plate 4a.

A piston 19 is arranged in the cylinder 18 and is urged by a spring 20 toward valve closing position. The piston 19 is mounted on a rod 21 on which is secured a yoke 22 operating simultaneously all the pintles of the injector valves 4 and 10. The pressurized fuel from pipe 24 admitted to the cylinder 18 acts against spring 20.

Normal ignition will resolve in continued maintenance of pilot valve 13 at the full open position due to the operation of the control unit C. Therefore the operating yoke 22 continues opening the valves 4 and 10 at the associated control rate to the full open position. The combustion chamber operating pressure builds up to design level as the fuel flow increases. The turbo pumps come up to speed and take over the fuel and oxidizer supply from the starter pumps thus maintaining design or normal operation. In the event that a combustion malfunction takes place during any of this operation, the malfunction system becomes operative.

The rapid shut down valve 23 is placed in communication with the fuel space in the cylinder 18 by pipe 24. The valve 23 is formed as a cylinder containing a hollow piston 25 which is urged toward closed position by coil spring 25a. Fuel flow toward the cylinder 18 creates a pressure drop across the restricted passage 23a through piston 25 which also urges the piston 25 toward the closed position. Reversal of fuel flow away from cylinder 18 on closing of pilot valve 13 creates a pressure drop across passage 23a which opposes spring 25a and urges piston 25 open. Opening motion of piston 25 permits flow from cylinder 18 to enter chamber 23b. The pressure force balance on piston 25 is immediately changed by virtue of the fuel pressure increase in chamber 23b which increases the opening force creating rapid motion to the exhaust position of valve 23. The main portion of the fuel from cylinder 18 is then ported directly to line 29 causing rapid venting of cylinder 18 and therefore effecting closure of the injector valves 4 and 10 by action of spring 20.

A three way valve 31 controls the admission of fuel under pressure to the malfunction control device. The normal operating position of valve 31 as shown in FIGURE 2 allows fuel to pass through line 2, line 3a, line 16, and line 35. In this position, pilot valve 13, rapid shut down valve 23, actuator cylinder 18, and actuator 32 are all supplied with fuel pressure. Voluntary shut down of the entire system may be effected by rotating the valve 31 to a position 90° clockwise of that shown in FIGURE 2. In this shut down postion, the fuel flow from line 2 to line 3a is terminated and the flow path is opened between line 3a and line 30 (drain line). Therefore, the pilot valve 13, rapid shut down valve 23, actuator cylinder 18, and actuator 32 are all open to drain allowing the spring biased pistons to close. In this manner, the piston 19, under the action of spring 20, closes (moves to the right in FIGURE 2) thereby moving yoke 22 and closing the injector plate valves 4 and 10.

A command shut down actuator 32 insures that the computer cannot effect opening of the injector valves 4 and 10 until a minimum fuel pressure is attained by the action of the starter pumps 2a and 8a. The actuator 32 is formed as a cylinder 33 containing a piston 34 moved in one direction by fuel introduced into the cylinder through a pipe 35 and urged in the opposite direction by spring 36. The piston 34 is mounted on a rod 37 extending through both ends of the cylinder and bearing with one end against the computing mechanism. The opposite end of the rod 37 is provided with a collar 38 adapted to reset a pivoted override lever 39.

The override lever 39 is operated with snap action by means of a spring 40 moving over center and a follower pin 41 riding on the surface of piston rod 21. The lever 39 is engaged by collar 42 on the rod 21 when the injector valves 4 and 10 are moved to an open position by movement of piston 19. As lever 39 is moved to the opposite or reset direction, the command shut down actuator 32 causes the malfunction device to close the injection valves 4 and 10 by engagement of a tail 43 of the lever 39 that is engaged by the collar 38 on the rod 37.

The override lever 39 is adapted to strike an override pin 44 slidable in the fixed structure 45 and engaged against one end of the small lever 46 pivoted to the fixed structure. The other end of the lever 46 engages the disc 47 that is secured to the rod 48 yieldly and axially connected to the rod 49 mounted on a bellows 50. Pressure is set into the bellows 50 from the starter chamber 11 through the pipe 50a. The force generated by the starter chamber pressure is reduced by the system of springs and is applied to lever 54 through rod 48 by spring 51. The reduction in force, designed to render the high starter chamber pressure (approximately 250 p.s.i.) equivalent to a combustion chamber pressure input of 80 p.s.i. at bellows 70, is achieved by absorbing most of the force generated by bellows 50 in the spring 52 which bears against the end plate of the bellows 50 and against the fixed structure. The balance of the force is transmitted through rod 49 to spring 51 and thereafter to rod 48. The computer device incorporated in the malfunction control system comprises a forced balance lever 54 pivoted at 55 on fixed structure 56. Lever 54 is engaged at one side of the pivot 55 by rod 48 and on the opposite side from rod 48 by rod 57, transmitting the differential fuel pressure of opposed bellows 58. Section 59 of the opposed bellows 58 receives pressure through pipe 60 from the combustion chamber and the other section 61 of the bellows receives fuel line pressure through pipe 62. The finger 63 transmits the differential pressure force through a spring 64 through rod 57, and through cantilever spring 65 to the fixed structure.

One end of cantilever spring 65 is secured in fixed structure 66. The deflection rate of spring 65 is modified by a series of stops 67 of decreasing height from the anchored end of spring 65. By proper calibration of these stops 67, the force input through shaft 57 is made a logarithmic function of the force at finger 63, or the logarithm of force exerted by finger 63 is equal to the force transmitted through rod 57.

The force transmitted to the short end 68 of rod 54 of the double bellows is therefore a logarithmic function of the differential pressure $(P_f - P_c)$ where $P_f$ equals yield supply pressure, and $P_c$ equals combustion chamber pressure.

On the opposite side of pivot 55, but on the same side of the lever 54 as rod 57, a bellows 70 is positioned and receives pressure through pipe 71 from the combustion chamber. The pressure developed in this bellows 70 is converted logarithmically and applied to balance lever 54 in a manner similar to that described for the opposed bellows 58. The pressure is transmitted by the bellows 70 to a cantilever spring 72, one end of which is mounted on a fixed structure 73. The spring 72 is constrained to follow a logarithmic deflection in a manner similar to that described for spring 65. The resulting movement of the bellows 70 is transmitted through a spring 74 to a rod 75 acting against a forced lever 54 at an equal distance from pivot 55 and in a direction which opposes the force exerted by rod 57. Both springs 64 and 74 deliver linear thrust against lever 54 but spring 74 is designed to be twice as stiff as spring 64 for reasons which will later appear. Lever 54 is engaged on the side opposite to rod 75 by rod 76 receiving the thrust of piston rod 21 through a spring 77 arranged between a disc 78 secured on piston rod 21 and a disc 79 integral with rod 76. The purpose of this spring is to transform the movement of the piston rod 21 into a force acting against the lever.

The purpose of interposing springs 64 and 74 between the respective force producing elements and lever 54 is to transform the logarithmic displacement of springs 65 and 72 to a logarithmic force by the linear reactions of the springs.

The force lever 54 is extended beyond the point of engagement of rods 75, 76 therewith, providing a longer arm 69 which is engaged by rod 37. The end of operating rod 15 is pivotally attached to the end of arm 69.

It is the purpose of the computer mechanism to compare the ratio of the propellant flow rate passing through and out of the combustion chamber to the propellant flow rate passing into the combustion chamber, and to operate a pilot valve controlling the actuation of the propellant injection valve in accordance with variations of the ratio. The computer mechanism will then take appropriate action when the flow rate entering the chamber exceeds the rate going out of the chamber. The terms selected in this case to represent these two parameters of flow rates, i.e. the combustion rate and the propellant flow rate, are respectively, the product of the effective flow rate through the fuel inlet valve 4 and the square root of the fuel pressure drop from the fuel valve 4 to the combustion chamber which may be expressed as $$K = A \frac{P_c}{\sqrt{P_f - P_c}}$$

where $P_c$ equals actual combustion chamber pressure; $A$ equals effective area of the fuel flow through valve 4 to the combustion chamber in square inches; $P_f$ equals fuel supply pressure in p.s.i.a.; and $K$ equals a predetermined critical value of the ratio. The purpose of taking the square root of $(P_f - P_c)$ is that flow through an orifice varies as the square root of the pressure drop. The problem may be solved by dealing with the corresponding logarithmic form of the equation which is $$\log P_c - \log A + \tfrac{1}{2} \log (P_f - P_c)$$

The motion of the injector plate valve operating shaft 21 is directly applied to the force balance lever 54 through a linear spring 77. The variation in flow area is made a logarithmic function of stroke by the contour of the injector plate valves 4 and 10. The conversion of the pressure forces from the linear functions obtained by the pressure bellows to a logarithmic function at the force balance lever 54 is accomplished by the cantilever springs 65 and 72, as described.

It may be seen that the operation of the computer so far described would not permit the starting of the rocket motor since this requires that the fuel be injected prior to the combustion and establishment of the corresponding combustion chamber pressure. The amount of fuel which may be safely injected prior to ignition is a very small quantity which therefore must be metered with extreme precision. An additional mechanism may be integrated with the computer mechanism to achieve this precise metering of the ignition flow. This mechanism is shown in FIGURE 2 and comprises a starter chamber pressure bellows 50 and force reducing springs 52 and 51, the over-center spring acting lever 39 and transmitting linkage lever 46 and pressure rod lever 44. The presence of starter chamber pressure at the required level in bellows 50 establishes the fact that a satisfactory source of ignition is present in the combustion chamber 4b. This pressure force is reduced by springs 52 and 51, to an input force at rod 48 which corresponds to chamber pressure. This apparent main chamber pressure satisfies the condition corresponding to direct functioning and permits opening of the main injector valves 4 and 10. When the valves reach the position at which ignition should have taken place, the collar 42 strikes pin 41 driving lever 39 over-center whereupon spring 40 exerts sufficient force through rod 44 and lever 46 to lift spring 51 and remove the starter chamber pressure force from shaft 48. A satisfactory chamber pressure must now exist at bellows 70 to replace the starter pressure input or else the computer will signal a complete shut down. It will be noted that the operation of the malfunction control described and illustrated includes a computing device which is fully automatic in operation and therefore independent of manual control.

Operation

All operation and mechanism functions pertinent to this specification have now been described. To aid in understanding the interrelation of these operations and functions a typical operating sequence is outlined.

At the commencement of operation the starter pumps 2a and 8a supply pressurized fuel and oxidizer to the injector plate valves 4 and 10, the secondary injector valve 6a, the starter chamber 11 and through the three-way control valve 31 to the malfunction control device C. A starter chamber 11 has been placed in operation by conventional valving and ignition means. At this point, the malfunction control device C will begin operation of the combustion chamber by permitting the injector plate valves 4 and 10 to open only if the following conditions are continued to be met;

(1) Sufficient fuel pressure is present at the injector plate valves to meet designed requirements. This is determined by the command shut down actuator 32 which moves the pilot valve through the medium of the lever 54 into the shut down position unless the fuel pressure is above the minimum requirement. Fuel pressures above the minimum urge piston 34 against spring 36 overcoming the preset force and thereby releasing the lever 54.

(2) An adequate ignition source at the main chamber is established. The ignition source is the exhaust gas from the starter chamber 11. Adequate supply of hot gases is evidenced by the sufficiently high level of starter chamber pressure. This is determined by the control device by transmitting this pressure input through bellows 50 and springs 52 and 51. The preset calibration of this mechanism insures that starter chamber pressure will be above the required minimum before the lever 54 will pivot from the shut down to the open position.

Assuming these necessary conditions are met, the injector plate valves 4 and 10 begin opening at a rate controlled by the adjustment of stop 14 located in pilot valve 13. At the position of lever 54 corresponding to the non-ignition detection point, the upper right lever 46 is snapped against the spring 51, lifting it and thereby uncoupling the starter chamber pressure input from lever 54. In order to maintain the pilot valve 13 at the open position adequate combustion chamber pressure must be present at the bellows 70.

Assuming for the moment that normal operation exists, the main injection valves 4 and 10 would reach the full open position and the entire engine would be operating under the proper fuel pressure and combustion chamber pressure. Normal operation as far as the present invention is concerned, means the operation of the rocket engine while it is supplied with fuel such that the combustion pressure corresponds to the fuel flow rate which occurs as a result of complete combustion of all the fuel. This system is designed to react to abnormal operation, which is a loss of combustion pressure without a corresponding drop in fuel flow rate. The system insures that the minimum value of fuel pressure and combustion chamber pressure is reached before the lever 54 will balance and that loss of either pressure in excess of the low and design limit will immediately shut down the engine. Auxiliary devices such as the starter chamber 11 and starter pumps 2a and 8a are cut out of the operation in accordance with the engine operating sequence. This operation is not directly involved with the operation of the present invention. At completion of the normal run command, command shut down is effected by moving valve 31 to the position 90° clockwise of the position shown on FIGURE 2 thereby terminating the supply of fuel pressure and venting the fuel pressure through pipe 30 to the pump $P_1$. It will be noted that this is identical to the condition which is automatically generated in the event of loss of fuel pressure and the control device reaction is the same in both cases. The command shut down generator 32 is urged by spring 36 to overpower the balance force system on lever 54 and drive pilot valve 13 to the closing position as well as resetting override lever 39. The rapid shut down sequence involving valve 23 is generated by the displacement of pilot valve 13 as has been fully described previously. The injector plate valves 4 and 10 are rapidly closed by this sequence and by the specified mechanism. The control system is seen, therefore, to be automatically reset and ready for restart immediately after completion of a shut down.

The operation just described represents a normal run. At any point in the operation, loss of the fuel pressure would precipitate the same rapid shut down sequence by unbalancing lever 54 to move pilot valve 13 to the closed position.

It is pointed out that while a complete operative malfunction device has been described, certain elements other than the computing device itself may be replaced by other means.

For instance, the means for initially placing the computer in operation by pressure from the starter chamber may be replaced by other means which automatically cut out after starting. Also, the command shut down actuator 32 and the rapid opening valve 23 are not necessary components of the computer control device in its basic configuration. The particular arrangement of the injector plate valves for computing flow might be replaced by a valve of standard arrangement in conjunction with a flow meter of suitable design with suitable arrangement of computer elements. Furthermore, the employment of conditions sensitive mechanism such as the starter chamber pressure input and the fuel pressure sensitive shut down actuator may be extended to include an unlimited number of devices of similar nature to determine the existence of all necessary or desired operating conditions, and to preclude operation if any condition is violated.

While the preferred embodiment of the invention has been specifically described and illustrated in the accompanying drawings, it is to be understood that the illustrated embodiment is not limitative of the invention since various modifications may be made therein by those skilled in the art without departing from the scope of the invention as defined by the appended claims.

We claim:

1. A control device in combination with a thrust chamber comprising: a source of fuel, conduit means communicating with said fuel source and said thrust chamber, a first means communicating with the thrust chamber for detecting the fuel flow rate into the said thrust chamber, a second means communicating with the thrust chamber for detecting the fuel flow rate from the thrust chamber, a pilot valve interposed in said fuel conduit means, a means for regulating fuel flow into said thrust chamber and a means for opening and closing the said pilot valve operated by the first and second fuel flow detecting means whereby the pilot valve may be closed when the fuel flow into the thrust chamber exceeds the fuel flow from the thrust chamber which operates to close the fuel flow regulating means.

2. A control device in combination with a thrust chamber as defined in claim 1 in which the fuel flow regulating means comprises: and injector plate valve having movable injectors therein and received by the said thrust chamber, a resiliently biased piston having a first and a second side contained in a closed cylinder, said injector plate valve injectors fixedly attached to the first side of the said piston, said fuel conduit means being attached to the closed cylinder and directed toward the first side of the said piston, and said piston being resiliently attached to the said means for closing the said pilot valve regulated by the first and second fuel flow detecting means whereby said piston will regulate said injector plate valve in relation to fuel flow.

3. A control device in combination with a thrust chamber comprising: a fuel source, a first conduit attached between the said thrust chamber and said fuel source, a lever having a first and second side, a pivot having a first and a second side supporting the said lever, a first element resiliently contacting the first side of the said lever, a first collapsible pipe attached between the said thrust chamber and the said first element urging the said first element out of contact with the said lever, a second collapsible pipe attached between the fuel source and the said first element urging the said first element against the said lever, a second resiliently biased element in contact with the lever positioned on the second side of the said pivot and on the first side of the said lever, a third collapsible pipe attached to the said second element and the thrust chamber tending to urge the second element against the lever, a third resiliently biased element touching the said lever directly opposite the said second element, a resiliently biased piston attached to the said third element, a cylinder enclosing the said piston, a means for regulating fuel to the thrust chamber attached to the said piston, a pilot valve, a rod attached between the said pilot valve and the said lever, a second conduit attached to the said fuel source and the said cylinder carrying a fuel under pressure, the pressure of said fuel acting to urge the said rod against the said lever and the said third element against the said lever, said pilot valve interposed in said second conduit between said cylinder and said fuel source, whereby a drop in fuel pressure or thrust chamber pressure causes the fuel regulating means to cut off fuel flow into the thrust chamber.

4. A control device in combination with the thrust chamber as defined in claim 3 and in addition a rapid shut down valve interposed in said second conduit and positioned between the said pilot valve and the said cylinder.

5. A control device in combination with a thrust chamber as defined in claim 3 in which the said first and second elements are positioned equidistant on opposite sides of the pivot for the lever.

6. A control device in combination with a thrust chamber as defined in claim 3 in which the said fuel regulating means is a fuel injector.

7. A control device in combination with a thrust chamber comprising: a fuel source, a first conduit connected between the fuel source and the thrust chamber, a balance member having a first and second side, a first resiliently biased rod contacting the first side of the balance member, a first bellows contacting said first rod and urging said first rod toward the first side of the balance member, a second conduit connected between the fuel source and the said first bellows, a second bellows contacting the said first rod positioned opposite the first bellows and urging the said first rod out of contact with the balance member, a second conduit connected between the said second bellows and the thrust chamber, a second resiliently biased rod contacting the first side of the balance member and positioned in spaced relation with the said first rod, a third bellows contacting the said second rod and urging said second rod toward the said balance member, a third conduit connected between the thrust chamber and the third bellows, a third resiliently biased rod contacting the second side of the balance member and positioned directly opposite the said second rod, a resiliently biased piston attached to the said third rod, a closed cylinder enclosing the said piston, a means for regulating the fuel flow received by the said thrust chamber and attached to the said piston, a fourth conduit interconnected between the fuel source and the cylinder, a pilot valve interposed in the fourth conduit and positioned between the fuel source and the said cylinder, and an operating rod attached to the pilot valve and to the said balance member, whereby a loss of fuel pressure or thrust chamber pressure will cause a change in position of the balance member thereby causing the pilot valve to cut fuel flow to the cylinder and cause the fuel regulating means to terminate fuel flow into the thrust chamber.

8. A control device in combination with a thrust chamber as defined in claim 7 and in addition a rapid shut down valve interposed in the said second conduit and positioned between the said pilot valve and the said cylinder.

9. A control device in combination with a thrust chamber as defined in claim 7, further including a pivot supporting said balance member medially of the ends thereof, and the said first and second rod being positioned equidistant on opposite sides of the pivot for the balance member.

10. A control device in combination with a thrust chamber as defined in claim 7 in which the said fuel regulating means is a fuel injector.

11. A control device in combination with a thrust chamber comprising: a source of fuel, conduit means communicating between the fuel source and thrust chamber, a first means communicating with the conduit means for detecting fuel flow rate into the thrust chamber, a second means communicating with the thrust chamber for detecting the fuel flow rate from the thrust chamber, a means associated with the thrust chamber for regulating fuel flow into the said thrust chamber, and a means attached to the fuel regulating means for comparing the fuel flow rate into the thrust chamber with the fuel flow rate out of the thrust chamber, said comparing means actuating said fuel regulating means to reduce the fuel flow rate into the thrust chamber when the fuel flow rate into the thrust chamber exceeds the fuel flow rate from the thrust chamber.

12. A control system for a rocket motor thrust chamber fueled by a fluid propellant source comprising: conduit means adapted to interconnect said thrust chamber and said fluid propellant source; first means for detecting the rate of propellant flow into said thrust chamber; second means for detecting the rate of gas flow out of said thrust chamber; means for regulating propellant flow into said thrust chamber, said regulating means being serially connected in the propellant flow path formed by said propellant source, said conduit means and said thrust chamber; a pilot valve interposed in said conduit means, said pilot valve being operatively connected with said regulating means; and means for actuating said pilot valve, said actuating means being associated with said first and second flow detecting means; said first and second detecting means energizing said actuating means to cause said pilot valve to operate to close said propellant regulating means when the propellant flow rate into the thrust chamber exceeds a magnitude forming a predetermined ratio with the gas flow rate from said thrust chamber.

13. A control device in combination with a thrust chamber comprising: a source of fuel, conduit means communicating between the fuel source and the thrust chamber; a first means for detecting fuel flow rate into the thrust chamber, the first detecting means communicating with the conduit means, and the first detecting means generating an output force which is proportional to the fuel flow rate into the thrust chamber; a second means for detecting fuel flow rate from the thrust chamber, the second detecting means communicating with the thrust chamber, and the second detecting means generating an output force which proportional to the fuel flow rate from the thrust chamber; means associated with the thrust chamber for regulating fuel flow into the thrust chamber, and means attached to the fuel regulating means for comparing the output forces exerted by the first and second detection means; whereby an excess of fuel flow rate into the thrust chamber in relation to the fuel flow rate out of the thrust chamber above a predetermined ratio will cause the comparison means to close the fuel flow regulation means.

References Cited in the file of this patent

UNITED STATES PATENTS

| | | |
|---|---|---|
| 2,724,239 | Fox | Nov. 22, 1955 |
| 2,761,282 | Allen | Sept. 4, 1956 |
| 2,779,158 | Dungan | Jan. 29, 1957 |
| 2,897,649 | Reddy | Aug. 4, 1959 |
| 2,995,008 | Fox | Aug. 8, 1961 |
| 3,069,849 | Crim | Dec. 25, 1962 |

FOREIGN PATENTS

| | | |
|---|---|---|
| 1,017,707 | France | Dec. 18, 1952 |